(No Model.)
H. TORCHIANI.
APPARATUS FOR RACKING BEER.
No. 519,513. Patented May 8, 1894.
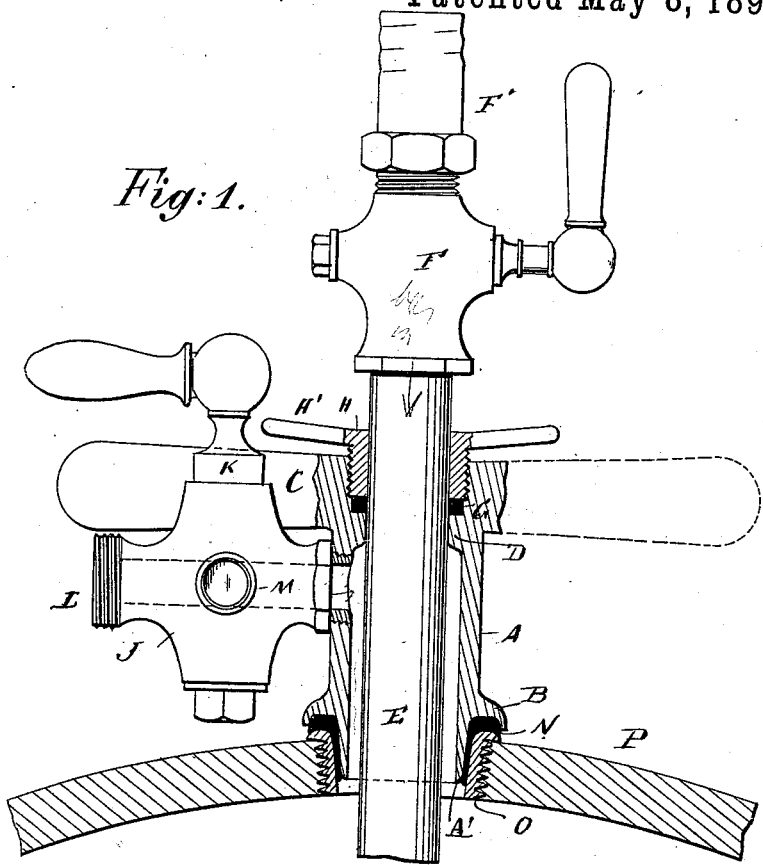
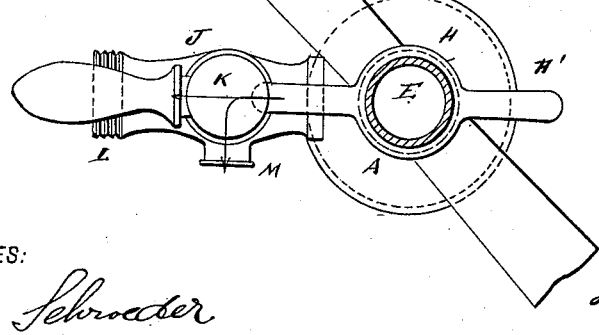
WITNESSES:
Charles Schroeder
Marion Hall
INVENTOR
H. Torchiani
BY Goepel & Raegener
ATTORNEYS.

UNITED STATES PATENT OFFICE.

HARRY TORCHIANI, OF NEW YORK, N. Y.

APPARATUS FOR RACKING BEER.

SPECIFICATION forming part of Letters Patent No. 519,513, dated May 8, 1894.

Application filed August 12, 1893. Serial No. 483,001. (No model.)

*To all whom it may concern:*

Be it known that I, HARRY TORCHIANI, a citizen of the United States, and a resident of the city of New York, in the county and State of New York, have invented certain new and useful Improvements in Apparatus for Racking Beer, of which the following is a specification.

This invention relates to that class of devices that are used in drawing or filling beer from casks into the barrels, half-barrels, kegs, &c.

The object of my invention is to provide an apparatus of this kind, which can readily be adjusted for barrels or kegs of different sizes, and which prevents the spurting of the beer from the apparatus or keg when the apparatus is withdrawn from the keg.

The invention consists, in the combination with a casing fitting in the bung-hole of the barrel or keg, of a sliding tube passing through said casing and provided at its upper end with a cock, a packing ring in a recess of the casing surrounding the sliding tube, and a screw bushing for compressing said packing ring.

The invention further consists in the combination with the said casing and sliding tube, of a three-way cock connected with the side of the casing for a purpose that will be fully set forth and described hereinafter.

In the accompanying drawings, Figure 1 is a side view of my improved apparatus for racking beer, parts being in vertical section. Fig. 2 is a plan view of the same, parts being in horizontal section.

Similar letters of reference indicate corresponding parts.

The cylindrical casing A has its lower end A' tapered externally and is provided a short distance above its lower end with an external annular flange B grooved on its under side. At its upper end, the casing A is provided with a suitable handle C for raising or lowering it. The upper part of the bore of the casing A is contracted to form a neck D through which a tube E can slide, which tube is provided on the upper end with a suitable cock F and with a neck F' for receiving the end of the hose by means of which the beer is conducted from the cask to the apparatus. A packing or stuffing ring G preferably made of rubber, is placed in a recess in the top of the casing so as to surround the tube E, and this packing ring can be compressed by means of a compression bushing H screwed into the recess in the top of the casing, and having a central aperture through which the tube E can pass, and which bushing H has handles H' for turning it. The casing J of a three-way cock K is screwed into the side of the casing A so as to establish communication between said casing A and the casing J of the three-way cock. The three-way cock casing J has a neck L on which a pipe can be screwed that leads to a suitable counter pressure device of any suitable construction and the said casing J is also provided with a neck M leading into the atmosphere. A leather or rubber gasket N of suitable shape is placed into the bushing O in the bung-hole of the barrel P and the lower tapered end of the casing A is forced into said gasket as shown in Fig. 1, the sliding tube E is raised and lowered according to the size of the barrel or keg, and is held at the desired elevation by the friction produced by the packing ring G. The cock F is now opened to permit the beer to pass from the cask through the pipe E into the barrel and the three-way cock K is so adjusted as to close the neck M and open the neck L so as to bring the interior of the barrel or keg in communication with the counter-pressure device. When the barrel or keg is filled the cock F is closed and the cock J is turned so as to open the neck M and interrupt the communication between the interior of the barrel and the counter-pressure device. The gases under pressure in the barrel or keg can now escape through the neck M and the apparatus can be withdrawn without causing any spurting of beer, and consequent loss of the same, either from the barrel or the apparatus.

Having thus described my invention, I claim as new and desire to secure by Letters Patent—

The combination with a casing fitting in the bung-hole of a barrel or keg to be filled, of a sliding-tube passing through said casing and provided at its upper end with a cock, and a three-way cock connected with said casing, which three-way cock has an opening into the outer air, substantially as set forth.

In testimony that I claim the foregoing as my invention I have signed my name in presence of two subscribing witnesses.

HARRY TORCHIANI.

Witnesses:
OSCAR F. GUNZ,
CHARLES SCHROEDER.